US011734220B1

(12) United States Patent
Narayana Iyer et al.

(10) Patent No.: US 11,734,220 B1
(45) Date of Patent: Aug. 22, 2023

(54) BI-PHASE MARK CODE ASYNCHRONOUS DECODER USING SPI BLOCK

(71) Applicant: Cypress Semiconductor Corporation, San Jose, CA (US)

(72) Inventors: Kailas Narayana Iyer, Bangalore (IN); Jeevith Kumar Nagamangala Muninarayanappa, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 9 days.

(21) Appl. No.: 17/669,693

(22) Filed: Feb. 11, 2022

(51) Int. Cl.
  *G06F 13/42* (2006.01)
  *G06F 1/12* (2006.01)
(52) U.S. Cl.
  CPC ............ *G06F 13/4282* (2013.01); *G06F 1/12* (2013.01); *G06F 2213/0002* (2013.01)
(58) Field of Classification Search
  CPC ..................................................... H04H 20/78
  See application file for complete search history.

(56) References Cited

U.S. PATENT DOCUMENTS 8,605,912 B2 * 12/2013 Elkhatib ............... H04L 7/0331
  375/360

* cited by examiner

*Primary Examiner* — Henry Tsai
*Assistant Examiner* — Juanito C Borromeo

(57) ABSTRACT

Disclosed are techniques for using firmware and hardware blocks of a device to decode signals encoded by signal edge positioning within a data bit width, such as bi-phase mark space coding (BMC) used for encoding in-band communication of wireless charging systems. The first device may use general purpose I/O (GPIO) interrupts to detect the start of a packet. The firmware may synchronize and configure the clock of a serial peripheral interface (SPI) to oversample the signals. The SPI may store the sampled data into a buffer, freeing the firmware from having to expend processing cycles to detect the transitions of the data in real-time. The firmware may read the buffered samples to decode the packet data in a post-processing stage. The firmware may detect the end of the packet by polling and GPIO interrupts or based on the samples read from the buffer to stop the clock of the SPI.

20 Claims, 9 Drawing Sheets

BI-PHASE MARK CODE ASYNCHRONOUS DECODER USING SPI BLOCK

This disclosure generally relates to technologies for decoding data encoded through the phase, timing, or positioning of signal edges within a data bit-width, and more particularly, to methods and systems for decoding bi-phase mark coded (BMC) data used for in-band communication in wireless charging systems.

BACKGROUND

Wireless charging systems allow batteries of portable devices to be charged wirelessly through inductive coupling of alternating current (AC) power signals transmitted by charging transmitters. Wireless charging standard such as the Qi specification promulgated by the Wireless Power Consortium defines the use of in-band communication between power transmitting devices and power receiving devices. For example, Qi standard-based wireless charging systems use amplitude shift keying (ASK) to modulate the AC power signal transmitted within the frequency band of 110 KHz to 250 KHz. When a power receiving device is placed on a transmitter mat, the receiving device modulates the power signal at rate of ~2 KHz with at least 200 mV or 15 mA depth and uses this ASK communication to send messages that configure, negotiate, regulate, and safeguard the power transfer. The power transmitting device demodulates the ASK signal using an envelope detector, takes corrective action and may acknowledge the ASK signal via in-band frequency shift keying (FSK).

The Qi standard specifies that data of the messages transmitted by the power receiving device are further encoded asynchronously using bi-phase mark space encoding, also referred to as BMC. In BMC, a "1" bit is encoded as a toggle of the binary signal from its current state at the beginning of the bit-width followed by another toggle at the middle of the bit-width; a "0" bit is encoded as a toggle of the binary signal from its current state at the beginning of the bit-width and the new state is sustained through the bit-width. The power transmitting device may decode the asynchronous BMC signal that has been demodulated by the ASK envelope detector to process the message. Conventionally, dedicated hardware or a firmware solution is used to decode the BMC signal. The drawbacks with decoding a BMC signal using dedicated hardware include added cost, complexity associated with integrating the hardware with the general microcontroller of the power transmitting device, and a lack of design flexibility. On the other hand, firmware-based BMC decoding imposes stringent latency requirement and severe constraint on the firmware design because processor bandwidth needs to be consumed every 250 µs or at an even shorter cycle time to detect the timing of toggling of the 2 KHz data. The BMC signal may also have frequency deviations and phase deviations, further complicating the design. A BMC decoder that is low cost, flexible, can be easily integrated with a general microcontroller, and does not impose stringent constraints on firmware processing is desirable.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
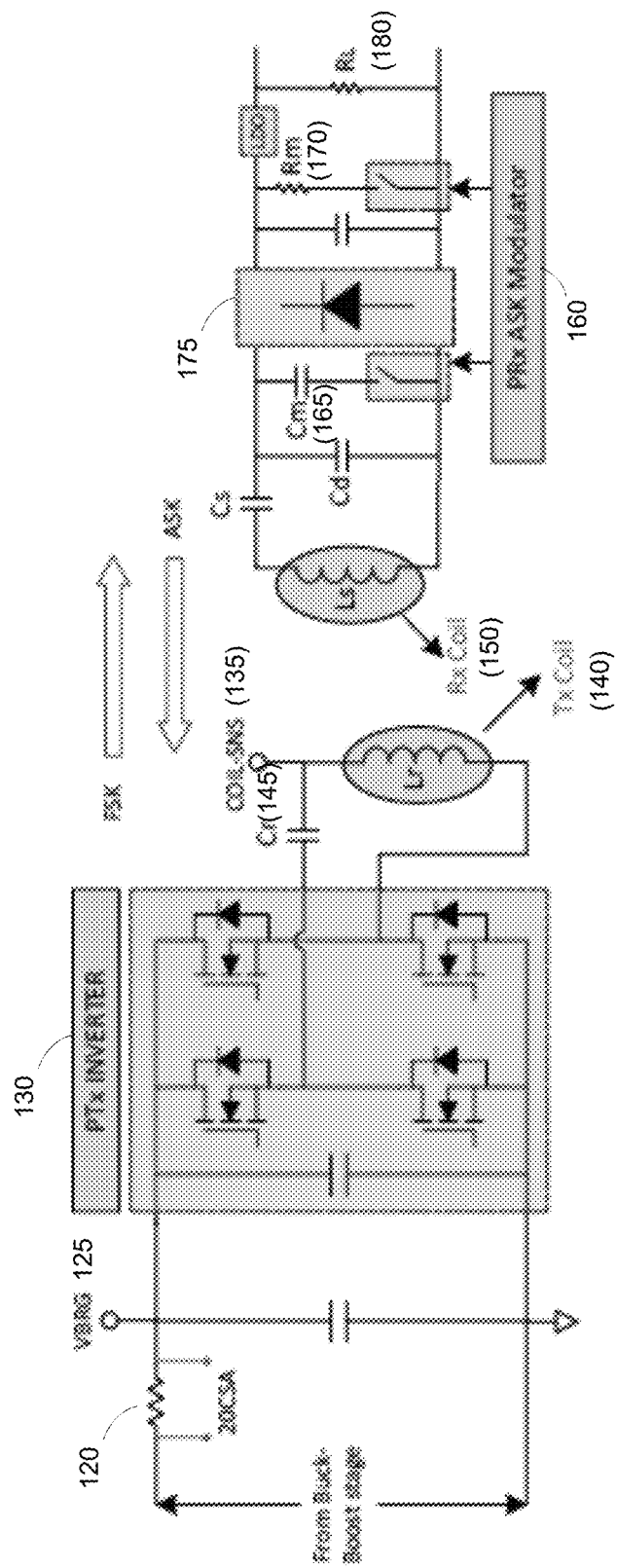
FIG. 1 depicts a scenario for in-band communication between a power transmitting device and a power receiving device in a wireless charging system in which the power receiving device modulates the power AC signal using ASK to transmit BMC-encoded data to the power transmitting device and the power transmitting device modulates the power AC signal using FSK to transmit data to the power receiving device in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Qi wireless charging standard specifies in-band data communication (e.g., handshake, regulation, protection and security) from a power receiving device (also referred to as a wireless power receiver or the load) to a power transmitting device (also referred to as a wireless power transmitter or the source) using ASK modulation and asynchronous bi-phase mark space coding (BMC). For example, the wireless power receiver may send a control error packet (CEP) at a certain time interval to the wireless power transmitter over the ASK in-band communication to communicate information about rectified output voltage error. The wireless power transmitter may use the information received in the CEP to regulate the power received by the wireless power receiver. To send data over the AC power signal using in-band ASK, the wireless power receiver modulates the load impedance seen by the wireless power transmitter. To do so, the wireless power receiver may modulate the power signal by switching a capacitor on a resonant tank circuit or a resistor on the output of a voltage rectifier. The modulator of the wireless power receiver may switch at 2 KHz and the modulation in the load impedance may be detected as the ASK modulated voltage or current of the magnetically coupled coil of the wireless power transmitter. The wireless power transmitter may sense and demodulate the ASK modulation of the voltage or the current using an envelope detector.

The wireless power transmitter may decode the BMC-encoded signal generated by the ASK envelope detector into binary data to process the packet. In BMC, there is a state transition or a toggle of the binary signal at the beginning of every bit-width. A "1" bit is encoded by another toggle at the middle of the bit-width while a "0" bit is encoded as no toggle at the middle of the bit-width. The message data may be segmented into byte blocks. A packet may be formatted as a preamble (a series of 1 s), followed by an encapsulated byte of header information, the byte blocks of the message data, and a checksum. Each byte block may be encapsulated with a start bit ('0'), the byte data, a parity bit (odd parity scheme), and a stop bit ('1').

The ASK modulation may vary as a function of the operating frequency, coupling variables such as the load current of the power receiving device and the load impedance, and design parameters such as the transmitter-to-receiver coil ratio, quality factor of coils used, etc. Thus, the frequency of the BMC-encoded signal may deviate from the 2 KHz baud rate and the toggle of the binary signals may have phase deviations. Even if a sampling clock used to sample the BMC-encoded signal is synchronized at the start of the packet, the BMC decoder may use a clock recovery circuit or a matching logic to reliably decode the full data of the packet.

Disclosed are techniques for using firmware and existing hardware blocks of a controller of a wireless power transmitter to perform decoding of BMC-encoded signals. In one aspect of the disclosure, the techniques may use existing blocks such as the serial peripheral interface (SPI) module of a power delivery controller or other general purpose microcontrollers to sample the BMC-encoded signals. The controller may also use existing general purpose I/O (GPIO) interrupts to detect the start of a BMC packet when the BMC-encoded signal transitions from a static state. Upon receiving the start of the packet interrupt from the GPIO, firmware running on the controller may synchronize and configure the clock of the SPI module to oversample the BMC data of the packet. In one embodiment, the controller may configure the clock of the SPI module to run at the oversampling frequency of 8× or 16× of the 2 KHz signal baud rate. The SPI module may sample the BMC data using the configured clock and may autonomously collect the serial samples into a buffer, also referred as a FIFO buffer or simply FIFO, for post-processing by firmware without further interactions from the controller, freeing the controller from having to expend processing bandwidth to sample the BMC data or to detect the transitions of the BMC data in real-time.

When the full packet has been received or when the FIFO is nearly full, the SPI module may interrupt the controller to read the collected sampled data from the FIFO. In one aspect, if the FIFO is large enough to store the sampled data for an entire packet, the SPI module may use direct memory access (DMA) to write the collected samples into the main memory of the controller without intervention from the firmware after the FIFO becomes full. Firmware may decode the sampled data through post-processing. The end of the packet may be flagged when no state transitions are detected over two consecutive data bit-widths. Upon detecting the end of the packet, the firmware may stop the clock of the SPI module and may read the remaining sampled data from the FIFO. In one aspect, the firmware may detect the end of the of the packet based on the samples received from the SPI module. In one aspect, the firmware may detect the end of the packet by polling and clearing the status of the GPIO interrupts periodically. In one aspect, the firmware running the post-processing decoding may perform clock error adjustment and glitch filtering of the sampled data to recover from clock jitter, and to compensate for frequency deviations and phase deviations of the BMC data. While the disclosed techniques are illustrated using BMC-encoded data, the techniques are applicable to other protocols that use the phase or positioning of signal transitions within a data bit-width to encode data.

FIG. 1 depicts a scenario for in-band communication between a power transmitting device and a power receiving device in a wireless charging system in which the power receiving device modulates the power AC signal using ASK to transmit BMC-encoded data to the power transmitting device and the power transmitting device modulates the power AC signal using FSK to transmit data to the power receiving device in accordance with one aspect of the present disclosure.

A DC voltage 125 from a buck or a boost stage of a DC/DC converter may be supplied to a full-bridge inverter stage 130 of the power transmitting device. The full-bridge inverter stage 130 may convert the DC voltage 125 to an AC square wave to feed the resonant tank formed by the transmitter coil 140 and resonant capacitor 145. The power transmitting device may control the voltage, frequency, phase angle or duty cycle of the full-bridge inverter stage 130 to regulate the power transfer at the power receiving device. The operating parameters of the full-bridge inverter stage 130 such as the output voltage and the bridge current may be a function of the frequency, coupling, DC input voltage, load of the power receiving device, coil parameters of the power receiving device, etc.

The AC power signal from the transmitter coil 140 is inductively coupled to the receiving coil 150 of the power receiving device. A voltage rectifier stage 175 may rectify the AC power to a DC voltage to drive a load 180 such as a rechargeable battery of the power receiving device. The power receiving device may modulate the AC power signal at 2 KHz by switching the modulator capacitor 165 under a capacitive modulation scheme or the modulator resistor 170 under a resistive modulation scheme.

The effect of the modulator switching is seen at the coil voltage 135 of the transmitter coil 140 or in the current of the DC voltage 125 flowing into the full-bridge inverter stage 130. In one embodiment, the coil voltage 135 or the voltage of the resonant capacitor 145 may be sensed in each half of the AC power cycle to provide the voltage path for ASK demodulation. The bridge current may be sensed by measuring the voltage drop across a current sensing resistor 120 placed in series with the full-bridge inverter stage 130 to provide the current path for ASK demodulation. The sensed current may also be used to regulate the operation of the buck/boost stage, or for power loss measurement to detect foreign objects in the field of the AC power. In one embodiment, the demodulated analog signal swing may have at least 100 mV depth. The power transmitting device may transmit data to the power receiving device through in-band FSK by modulating the switching frequency of the full-bridge inverter stage 130 to change the voltage of the receiving coil 150.

An envelope detector may process the sensed coil voltage or the sensed bridge current to demodulate the ASK signal. For example, a pulse amplifier and comparator block (not shown) may process the sensed voltage through a low pass filter and DC blocking circuit to generate a clean 2 KHz modulated signal. A gain stage of the pulse amplifier and comparator block may amplify the 2 KHz modulated signal and compare the amplified signal from the gain stage to generate the ASK digital output for BMC decoding. In one aspect, the coil voltage and the bridge current may be sensed by current sense amplifiers of a power delivery controller and supplied to an external pulse amplifier and comparator block. The ASK digital output containing the BMC data from the pulse amplifier and comparator block may be routed back to the power delivery controller for BMC decoding.

Figure 2:
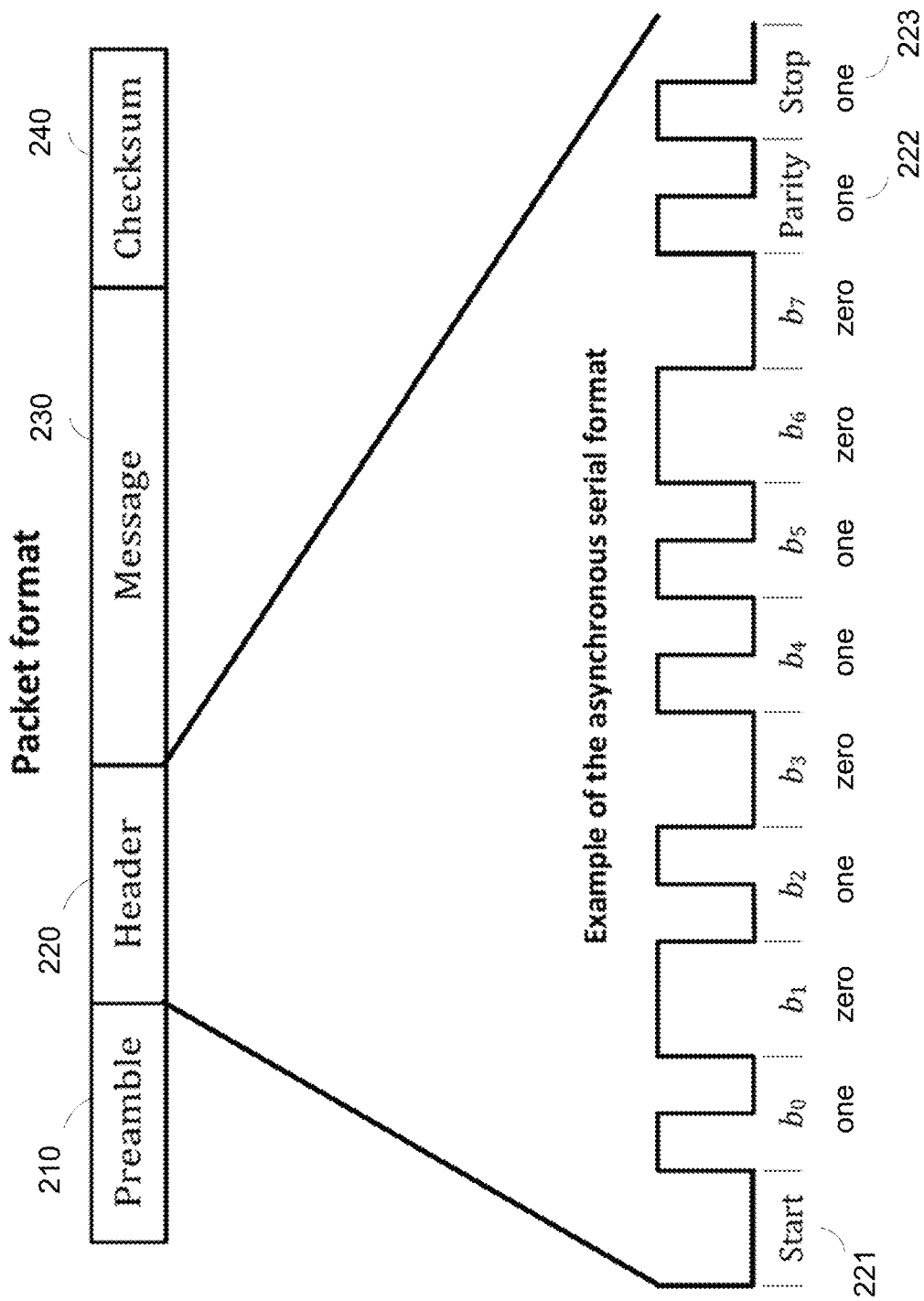
FIG. 2 illustrates the format of a message packet encoded using BMC that may be used for in-band communication from a power receiving device to a power transmitting device in a wireless charging system accordance with one aspect of the present disclosure.

FIG. 2 illustrates the format of a message packet encoded using BMC that may be used for in-band communication from a power receiving device to a power transmitting device in a wireless charging system accordance with one aspect of the present disclosure. The packet starts with a preamble 210 (a series of 1 s) to allow the clock of the BMC decoder to synchronize to the 2 KHz baud rate. The BMC decoder may detect the start of the preamble 210 as a first transition of the BMC-encoded signal from a static state. In one aspect, a GPIO of a general microcontroller or a power delivery controller may receive the BMC data of the packet. When the GPIO detects the first transition on the BMC data, the GPIO may generate an interrupt to the general microcontroller or the power delivery controller to indicate the start of the packet.

A header field 220 following the preamble 210 encapsulates a start bit ('0'), a byte of header information, a parity bit (odd parity scheme), and a stop bit ('1'). A toggle of the binary signal occurs at the beginning of every bit-width. A "1" bit is encoded by another toggle at the middle of the bit-width while a "0" bit is encoded as no toggle at the middle of the bit-width. A message field 230 following the header field 220 encapsulates segmented byte blocks of the message data. Each byte block of the is encapsulated using the same byte format as the header field 220. A checksum 240 follows the message field 230. The BMC decoder may detect the end of the packet when the binary signal does not toggle for two consecutive bit-widths. A packet under the Qi wireless charging standard may typically be 28 bytes long.

In one aspect, firmware executing on the general microcontroller or the power delivery controller may configure an existing SPI module as a master SPI to sample the BMC data upon receiving the start of the packet interrupt from the GPIO. The firmware may configure the clock of the SPI module to oversample the BMC data. The SPI master may receive the BMC data through the master in slave out (MISO) data line. Other data lines may be left unused or repurposed by the firmware. SPI is a synchronous protocol, but the BMC data is asynchronous. The firmware may configure the SPI clock to provide initial clock alignment and start the master SPI module as soon as a transition is detected on the data line. In one aspect, the firmware may poll in a tight loop to detect the start of the packet interrupt from the GPIO.

In one aspect, for accurately clocked input based on an estimated or measured bit error or packet error rate of the in-band communication from the power receiving device, the SPI clock may be configured to run at 2× the input baud rate. If there is clock jitter or a high bit error or packet error rate, the SPI clock may be configured to run at 8× or 16× the input baud rate. When configured to run at 8× the 2 KHz baud rate of the Qi compliant BMC packet, the SPI clock runs at 16 KHz to generate a byte of samples for each bit of the BMC data every 0.5 ms or 8 bytes of samples for each byte of the BMC data every 4 ms.

The master SPI module samples the data line at the same time as transmitting data. To receive data, the firmware may configure the SPI module to transmit dummy data. The SPI module may sample the BMC-encoded signal on the data line using the configured clock and may autonomously collect the serial samples into a FIFO without further interactions from the firmware. In one aspect, the SPI module may use a FIFO water mark interrupt to avoid FIFO overflow. The SPI module may generate an interrupt when the FIFO water mark is reached to alert the firmware to read the collected samples. The SPI may continue to store new samples into the FIFO while the firmware reads previously stored samples. In one aspect, the firmware may poll the SPI module in a main task loop to read the stored samples without receiving a FIFO water mark interrupt. In one aspect, if the FIFO is large enough, the SPI module may store the samples for the entire packet for the firmware to read. In one aspect, the SPI module may use direct memory access (DMA) to write the samples from the FIFO into the main memory of the general microcontroller or the power delivery controller without intervention from the firmware.

The firmware may detect the end of the of the packet based on the samples received from the SPI module. The end of the packet may be flagged when no state transitions are detected over two consecutive data bit-widths. For example, when the SPI clock is configured for 8× oversampling, the firmware may determine the end of the packet when the samples received from the SPI FIFO remain the same for 16 samples (e.g., two bytes). Upon detecting the end of the packet, the firmware may stop the clock of the SPI module and may read the remaining sampled data from the FIFO. In one aspect, the firmware may detect the end of the packet by polling and clearing the status of the GPIO interrupts periodically to detect if there is no activity on the data line. However, this approach may not be as desirable as the SPI FIFO-based approach, as GPIO polling incurs firmware overhead.

Figure 3:
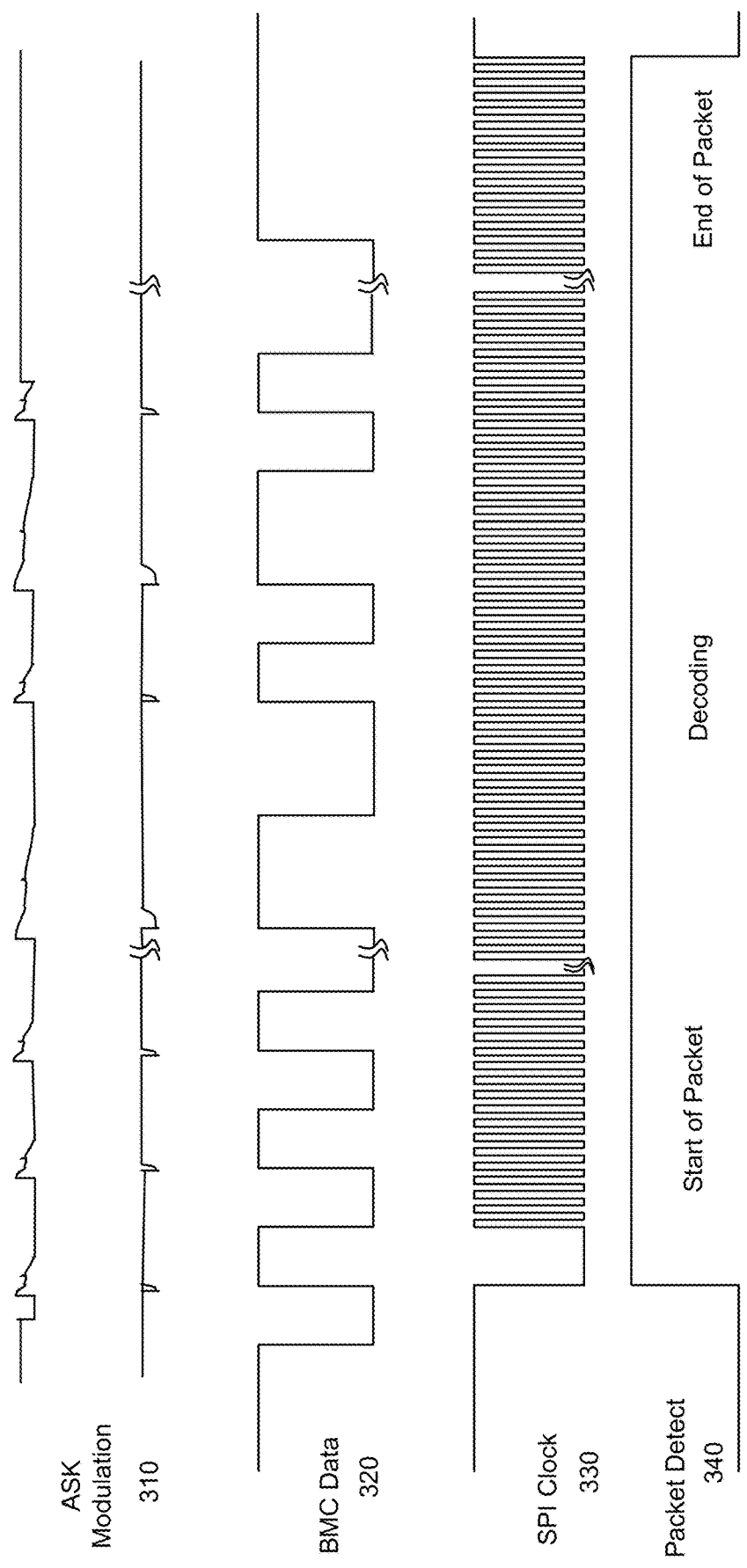
FIG. 3 illustrates the waveform of the ASK-modulated power AC signal carrying BMC-encoded data of a message packet and the use of the clock of a master serial peripheral interface (SPI) module of a controller of a power transmitting device to sample the timing of toggling of the BMC-encoded data in accordance with one aspect of the present disclosure.

FIG. 3 illustrates the waveform of the ASK-modulated power AC signal 310 carrying BMC-encoded data 320 of a message packet and the use of the clock 330 of a SPI master of a controller of a power transmitting device to sample the timing of toggling of the BMC-encoded data 320 in accordance with one aspect of the present disclosure. An envelope detector may demodulate the ASK-modulated power AC signal 310 to generate the BMC data 320 at the 2 KHz baud rate. The BMC data 320 may be supplied to a GPIO and the MISO data line of a master SPI of the controller. The clock 330 of the SPI master is initially disabled.

When the GPIO detects the first transition of the BMC data 320, the GPIO may generate an interrupt to a CPU of the controller to indicate the start of the packet. The interrupt handler may read and clear the GPIO interrupt status in a tight loop to synchronize the clock 330 to the transitions on the data line. The firmware may assert the packet detect flag 340 when the start of the packet is confirmed. In one aspect, the firmware may align and configure the clock 330 of the SPI master to run at 8× the 2 KHz baud rate to start sampling the BMC data 320 on the next bit of the preamble.

The SPI master oversamples the BMC data 320 using the clock 330 for storage in a FIFO, with each data bit generating 8 samples. The firmware may read the FIFO before the entire packet is received by the SPI master to decode the packet data on-the-fly or may wait until the entire packet is received to decode the packet data in a post-processing stage. To detect the end of the packet, the firmware may poll and clear the GPIO interrupt status periodically to detect a static state on the BMC data or may decode the samples read from the FIFO to determine if there is no activity on the data line for two consecutive data bit-widths. When the end of the packet is detected, the firmware may disable the clock 330 of the SPI master to stop further sampling of the BMC data 310 and may read any remaining samples in the FIFO.

As indicated, the firmware may read the samples from the FIFO to decode the packet data in a post-processing stage after the entire packet has been sampled by the SPI master. In one embodiment, the firmware may read the FIFO to start decoding while the BMC data 320 is still being sampled by the SPI master. In either scenario, when the packet data has a preamble (a series of 1 s), the firmware may drop the first transition in the sampled data.

The firmware may decode the packet data by counting the number of repeated samples until a transition is detected. In one aspect, if the repetition count is 4, then the received data may be preliminarily detected as the first half of a '1' bit. The firmware may confirm the '1' bit by verifying that the repetition count is 4 for the second half of the '1' bit. If the repetition count is 8, then the received data may be detected as a '0' bit. Because there may be clock jitter, frequency deviations and phase deviations of the BMC data, etc., the repetition count between transitions may not be exactly 4 or 8. The repetition count thresholds for bit decisions may be relaxed to allow for clock recovery. In one aspect, the repetition count threshold for a bit may be relaxed to allow for a 25% error margin. This may be accomplished by using the repetition count of 6 as the decision threshold for the bit decoding. For example, if two consecutive repetition counts are both less than 6, then the bit is decoded as a '1'; otherwise, if the repetition count is equal to or greater than 6, it's decoded as a '0'. In one aspect, if a repetition count for a first half of the bit-width is less than the repetition count threshold but the repetition count for a second half of the bit-width is not less than the repetition count threshold, the firmware may declare a bit error or a packet error.

Figure 4:
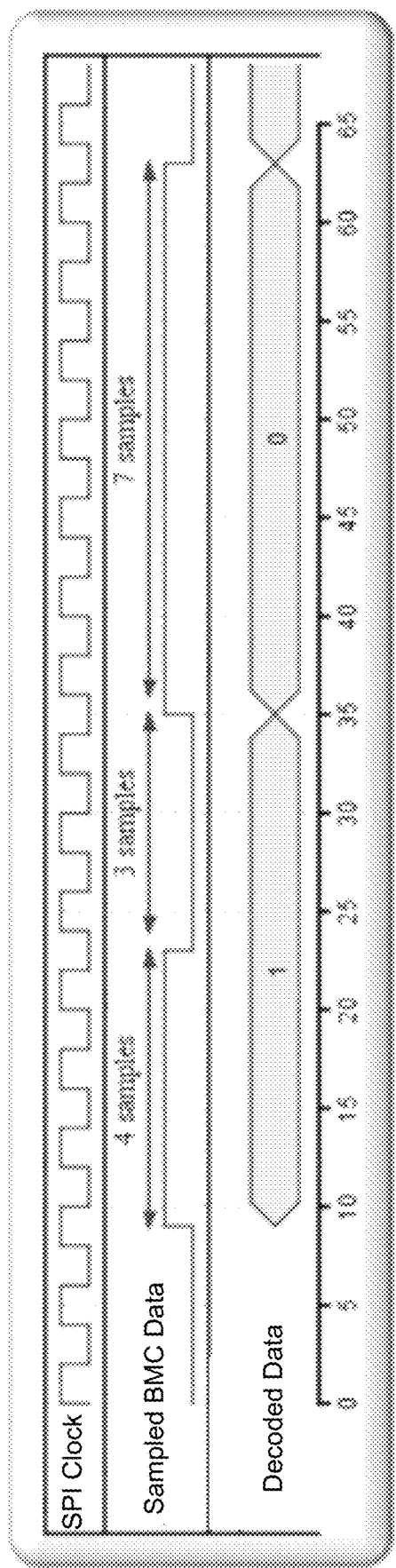
FIG. 4 illustrates BMC decoding that may be performed by firmware using 8× oversampled data of the BMC-encoded data from the SPI module in accordance with one aspect of the present disclosure.

FIG. 4 illustrates BMC decoding that may be performed by firmware using 8× oversampled data of the BMC-encoded data from the SPI module in accordance with one aspect of the present disclosure. The SPI module may sample the BMC-encoded data on the falling edge of the SPI clock. The firmware detects 4 samples between transitions in a first repetition count followed by 3 samples between transitions in a second decision count. Because the repetition counts of 4 and 3 are both less than 6, the samples are decoded as the two halves of a '1' bit. When the firmware subsequently detects 7 samples between transitions, because the repetition count of 7 is not less than 6, the samples are decoded as a '0' bit.

Figure 5:
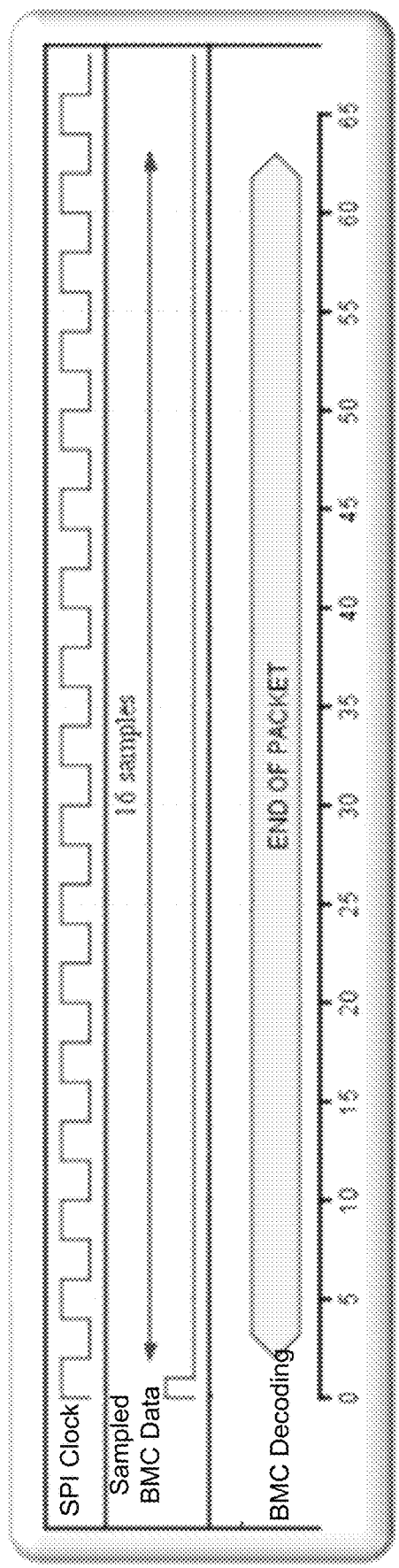
FIG. 5 illustrates the detection of the end of the message packet that may be performed by firmware using 8× oversampled data of the BMC-encoded data from the SPI module in accordance with one aspect of the present disclosure.

When the end of the packet is reached, the SPI master may continue to store samples until the SPI clock is disabled by the firmware. FIG. 5 illustrates the detection of the end of the message packet that may be performed by firmware using 8× oversampled data of the BMC-encoded data from the SPI module in accordance with one aspect of the present disclosure. When the firmware detects no transitions of the sampled data for two consecutive data bit-widths of 16 samples, the firmware may declare this as the end of the packet to disable the SPI clock. In one aspect, the firmware may declare the end of the packet when the repetition count has surpassed the sample count for one bit-width but less than two bit-widths, for example 12.

In one aspect, the firmware may implement a glitch filter to ignore a glitch in the sampled data detected as a repetition count of 1 or a single entry toggle. In the case of higher bit error rate or more stringent glitch removal requirements, the firmware may increase the SPI clock to 16× the data baud rate. In this case, a larger error margin for the repetition count decision threshold may be provided to decode the samples.

Figure 6:
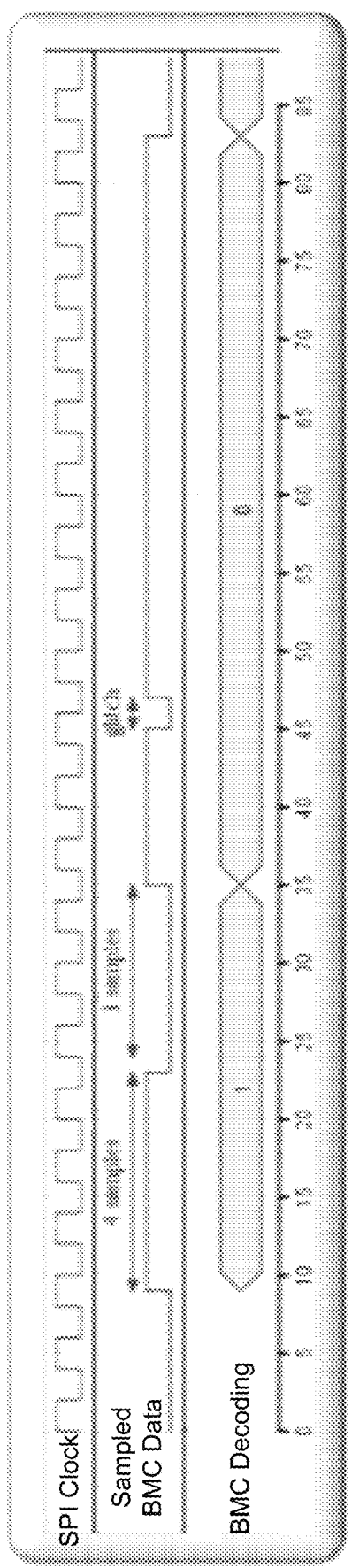
FIG. 6 illustrates the glitch filter that may be performed by firmware to remove glitches in the 8× oversampled data of the BMC-encoded data from the SPI module in accordance with one aspect of the present disclosure.

FIG. 6 illustrates the glitch filter that may be performed by firmware to remove glitches in the '8' oversampled data of the BMC-encoded data from the SPI module in accordance with one aspect of the present disclosure. As in FIG. 4, the repetition counts of 4 and 3 in the samples are decoded as the two halves of a '1' bit. A repetition count of 1 in the samples of the following bit is ignored by the glitch filter to remove the glitch in the sampled data. The repetition count in the samples becomes greater than 6 and the second bit is decoded as a '0' bit. In one aspect, after the bits are decoded, the firmware may process the packet data based on the packet protocol.

Figure 7:
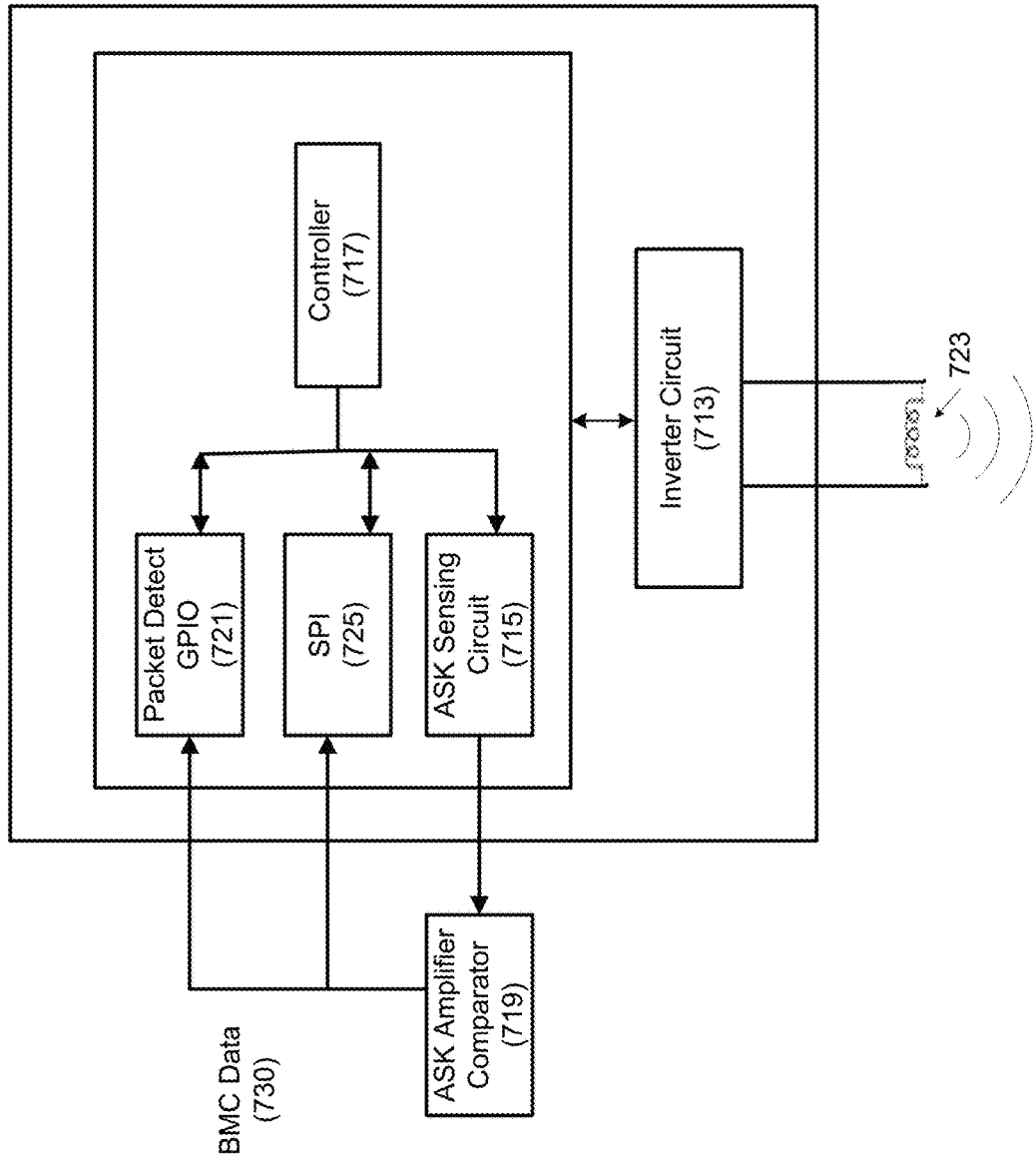
FIG. 7 is a block diagram of a wireless transmitting device including circuitry configured to demodulate the ASK-modulated power AC signal, a GPIO configured to detect the start of a message packet, a SPI module configured to sample the BMC-encoded data, and a controller executing firmware to decode the samples generated from the SPI module in accordance with one aspect of the present disclosure.

FIG. 7 is a block diagram of a wireless transmitting device 711 including circuitry configured to demodulate the ASK-modulated power AC signal, a GPIO 721 configured to detect the start of a message packet, a SPI module 725 configured to sample the BMC-encoded data, and a controller 717 executing firmware to decode the samples generated from the SPI module 725 in accordance with one aspect of the present disclosure. The wireless transmitting device 711 may be implemented as a power delivery controller IC.

The wireless transmitting device may include an inverter circuit 713 to convert DC voltage to an AC square wave to drive a transmitter coil 723. The controller 717 may control the voltage, frequency, phase angle or duty cycle of the inverter circuit 713 to regulate the power transfer to a power receiving device. An envelope detector such as an ASK sensing circuit 715 may sense the current flowing into the inverter circuit 713 or the voltage of the transmitter coil 723 under the control of the controller 717. The ASK sensing circuit 715 senses the ASK modulation of the power AC signal from the power receiving device as reflected in the modulation of the load impedance. An external ASK amplifier comparator module 719 may process the sensed coil voltage or the sensed inverter current from the ASK sensing circuit 715 to generate the demodulated ASK digital output containing the BMC data 730.

The BMC data 730 may be supplied to the GPIO 721 and the input data line of the SPI module 725. When the GPIO 721 detects the first transition of the BMC data 730, the GPIO 721 may generate an interrupt to the controller 717 to indicate the start of the message packet. Upon receiving the interrupt, the controller 717 may align and configure a clock of the SPI module 725 to run at a multiple of the baud rate of the BMC data 730 to oversample the BMC data 730.

The SPI module 725 may store the sampled data into a FIFO. The controller 717 may poll the GPIO 721 periodically to detect a static state of the BMC data 730 as an indication of the end of the packet. The controller 717 may access the FIFO of the SPI module 725 to read the sampled data when the end of the packet is detected or while the BMC data 730 is still being sampled by the SPI module 725. When the end of the packet is detected, the controller 717 may disable the clock of the SPI module 725 to stop further sampling of the BMC data 720.

The controller 717 may process the sampled data to decode the packet data by looking for the number of repeated samples between transitions. The controller 717 may perform clock error adjustment and glitch filtering of the sampled data to recover from clock jitter, and to compensate for frequency deviations and phase deviations of the BMC data 730.

Figure 8:
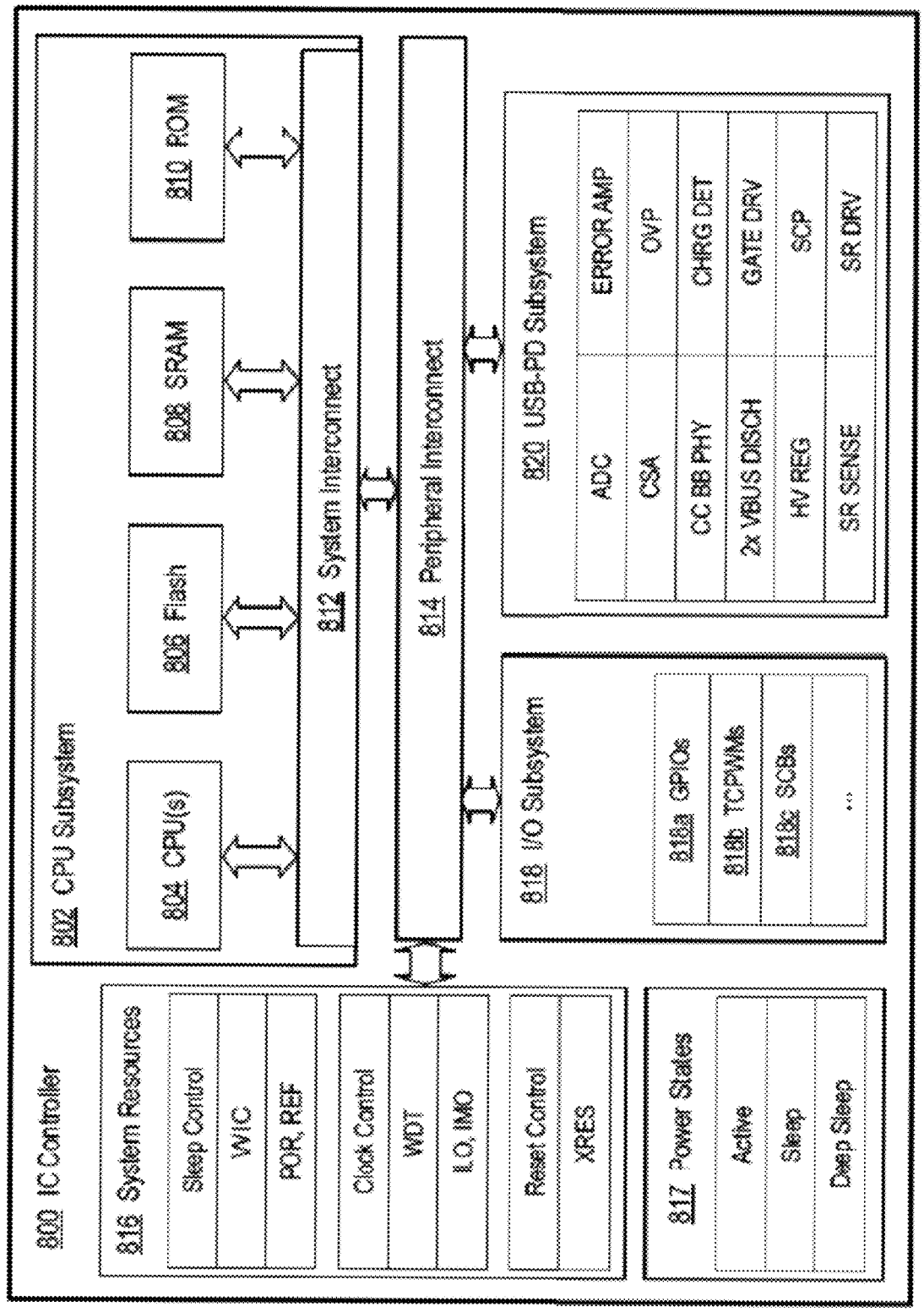
FIG. 8 is a block diagram of a power delivery IC controller containing CPU subsystem, peripheral interconnect, system resources, input/output (I/O) subsystem, Universal Serial Bus Power Delivery (USB-PD) subsystem, and various terminals (e.g., pins) that are configured for receiving and sending signals to decode BMC-encoded data in accordance with one aspect of the present disclosure.

FIG. 8 is a block diagram of a power delivery IC controller 800 containing CPU subsystem 802, peripheral interconnect 814, system resources 816, input/output (I/O) subsystem 818, Universal Serial Bus Power Delivery (USB-PD) subsystem 820, and various terminals (e.g., pins) that are configured for receiving and sending signals to decode BMC-encoded data in accordance with one aspect of the present disclosure.

CPU subsystem 802 includes one or more CPUs (central processing units) 804, flash memory 806, SRAM (Static Random Access Memory) 808, and ROM (Read Only Memory) 810 that are coupled to system interconnect 812. CPU 804 is a suitable processor that can operate in an IC or a SoC device. Flash memory 806 is non-volatile memory (e.g., NAND flash, NOR flash, etc.) that is configured for storing data, programs, and/or other firmware instructions. Flash memory 806 is tightly coupled within the CPU subsystem 802 for improved access times. SRAM 808 is volatile memory that is configured for storing data and firmware instructions accessed by CPU 804. ROM 810 is read-only memory (or other suitable storage medium) that is configured for storing boot-up routines, configuration parameters, and other firmware parameters and settings. System interconnect 812 is a system bus (e.g., a single-level or multi-level Advanced High-Performance Bus, or AHB) that is configured as an interface that couples the various components of CPU subsystem 802 to each other, as well as a data and control interface between the various components of the CPU subsystem and peripheral interconnect 814.

Peripheral interconnect 814 is a peripheral bus (e.g., a single-level or multi-level AHB) that provides the primary data and control interface between CPU subsystem 102 and its peripherals and other resources, such as system resources 816, I/O subsystem 818, and USB-PD subsystem 820. The peripheral interconnect 814 may include various controller circuits (e.g., direct memory access, or DMA controllers), which may be programmed to transfer data between peripheral blocks without burdening the CPU subsystem 802. In various embodiments, each of the components of the CPU subsystem and the peripheral interconnect may be different with each choice or type of CPU, system bus, and/or peripheral bus.

System resources 816 include various electronic circuits that support the operation of IC controller 800 in its various states and modes. For example, system resources 816 may include a power subsystem having analog and/or digital circuits required for each controller state/mode such as, for example, sleep control circuits, wake-up interrupt controller (WIC), power-on-reset (P OR), voltage and/or current reference (REF) circuits, etc. In some embodiments, the power subsystem may also include circuits that allow IC controller 800 to draw and/or provide power from/to external sources with several different voltage and/or current levels and to support controller operation in several power states 817 (e.g., such as active state, sleep state, and a deep sleep state with clocks turned off). Further, in some embodiments the CPU subsystem 802 may be optimized for low-power operation with extensive clock gating and may include various internal controller circuits that allow the CPU to operate in the various power states 817. For example, the CPU may include a wake-up interrupt controller that is configured to wake the CPU from a sleep state, thereby allowing power to be switched off when the IC chip is in the sleep state. System resources 816 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. System resources 816 may also include analog and/or digital circuit blocks that provide reset control and support external reset (XRES).

I/O subsystem 818 includes several different types of I/O blocks and subsystems. For example, I/O subsystem 818 includes GPIO (general purpose input output) blocks 818*a*, TCPWM (timer/counter/pulse-width-modulation) blocks 818*b*, and SCBs (serial communication blocks) 818*c*. GPIOs 818*a* include analog and/or digital circuits configured to implement various functions such as, for example, pull-ups, pull-downs, input threshold select, input and output buffer enabling/disabling, multiplex signals connected to various I/O pins, etc. One of the GPIOs 818*a* may be used to detect the start of the BMC data packet as discussed. TCPWMs 818*b* include analog and/or digital circuits configured to implement timers, counters, pulse-width modulators, decoders and various other analog/mixed signal elements that are configured to operate on input/output signals. SCBs 818*c* include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc. The SPI may be configured as a master to autonomously sample the BMC data for post-processing by the CPU subsystem 802 for BMC decoding.

USB-PD subsystem 820 provides the interface to a power connector such a USB Type-C port. As used herein, "USB-PD subsystem" refers to one or more logic blocks and other analog/digital hardware circuitry, which may be controllable by firmware and which is configured and operable to perform the functions and to satisfy the requirements specified in at least one release of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables (e.g., up to 5 A of current at up to 20V, for a total of up to 100 W of power). The USB-PD specification also defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging).

Among other circuitry, USB-PD subsystem 820 may include: one or more analog-to-digital convertors (ADCs) for converting various analog signals to digital signals; an error amplifier (ERROR AMP) for controlling the power source voltage applied to the VBUS line per a PD contract; a current sense amplifier (CSA) and an over-voltage protection (OVP) circuits for providing over-current and over-voltage protection on the VBUS line with configurable thresholds and response times; a communication channel PHY (CC BB PHY) logic for supporting communications on a Type-C Communication Channel (CC) line; a charge detector logic block (CHRG DET) connected to the DP and DM lines for detecting conventional battery chargers conforming to various standard and proprietary battery charging specifications; at least two on-die discharge (VBUS DISCH) circuits that can discharge a VBUS line voltage to any of range of programmable voltage levels; one or more gate drivers (GATE DRV) for controlling the power switches that turn on and off the provision of power over the VBUS line; a high voltage regulator (HV REG) for converting the power supply voltage to the precise voltage (e.g., 3-5V) needed to power IC controller 800; and a short circuit protection block (SCP) for additional short circuit detection across an external resistor coupled on the ground return path.

Figure 9:
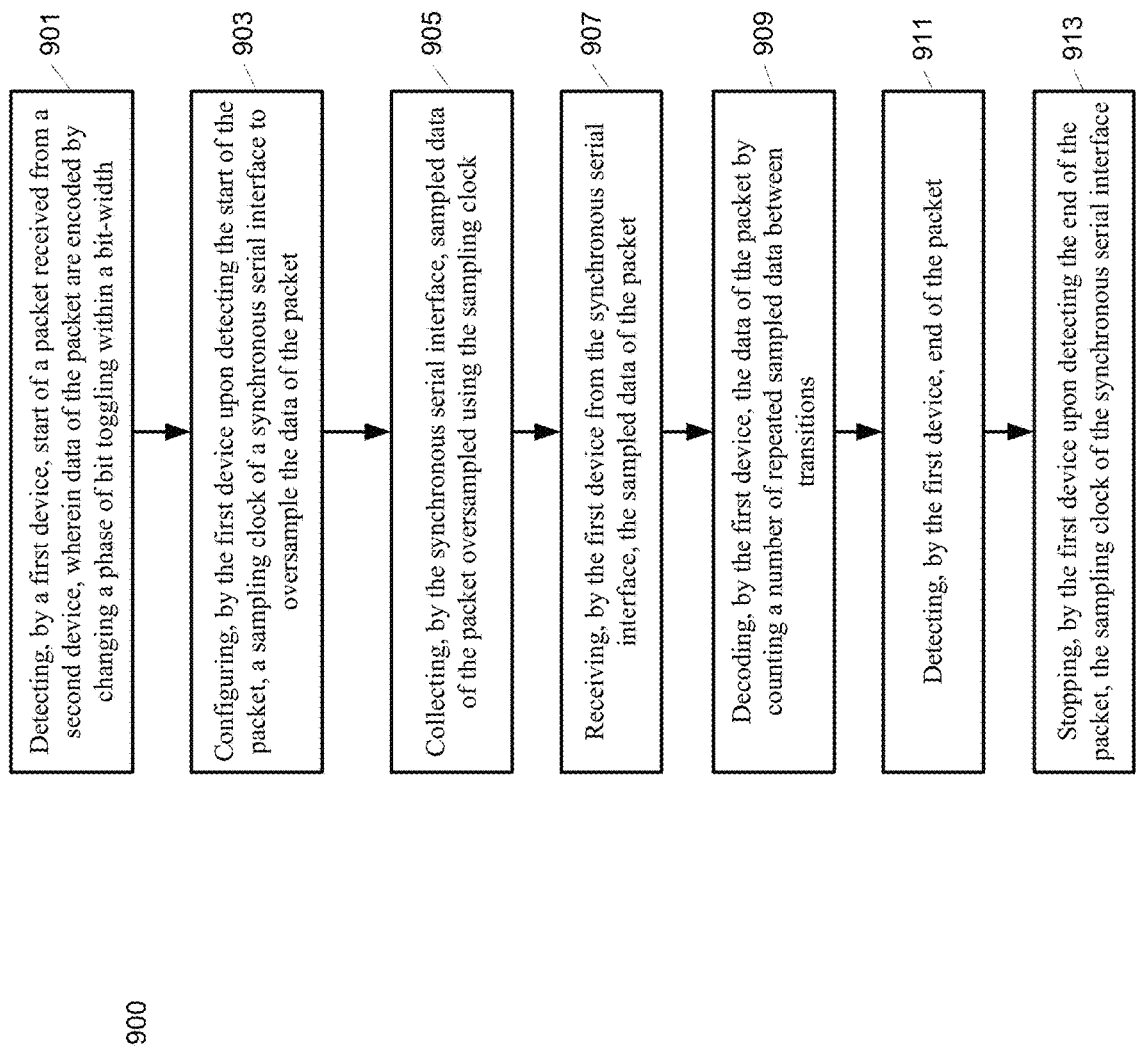
FIG. 9 illustrates a flow diagram of a method for decoding BMC-encoded data packet or other type of data packet encoded through the phase of signal edges within a data bit-width in accordance with one aspect of the present disclosure.

FIG. 9 illustrates a flow diagram of a method 900 for decoding BMC-encoded data packet or other type of data packet encoded through the phase of signal edges within a data bit-width in accordance with one aspect of the present disclosure. In one aspect, the method 900 may be performed by a power transmitting device utilising hardware, software, or combinations of hardware and software, such as the wireless transmitting device 711 of FIG. 7 or the power delivery IC controller 800 of FIG. 8

In operation 901, a first device detects the start of a packet received from a second device. The data of the packet are encoded by changing the phase of bit toggling or signal edge positioning within a data bit-width. In one aspect, the packet data are encoded using BMC. A GPIO of the first device may detect the first transition of the BMC data to generate an interrupt to a controller of the first device to indicate the start of the packet.

In operation 903, the first device, upon detecting the start of the packet, configures a sampling clock of a synchronous serial interface of the first device to oversample the data of the packet. In one aspect, the controller of the first device may align and configure a clock of a SPI module of the first device to run at a multiple of the baud rate of the data to sample the packet data.

In operation 905, the synchronous serial interface of the first device collects sampled data of the packet oversampled using the configured sampling clock. In one aspect, the synchronous serial interface may store the sampled data into a FIFO without software intervention by the controller of the first device.

In operation 907, the first device receives from the synchronous serial interface the sampled data when the sampled data is indicated as being available. In one aspect, the controller may access the FIFO of the synchronous serial interface to read the sampled data upon receiving an interrupt from the synchronous serial interface that the FIFO is nearly full or when the controller determines that the end of the packet is reached (e.g., through polling and clearing the GPIO of the first device).

In operation 909, the first device decodes the data packet by determining a number of repeated sampled data between transitions of the sampled data. In one aspect, when the packet data are encoded using BMC, the controller may compare the number of repeated sampled data between transitions, also referred to as a repetition count, to a repetition count decision threshold. If two consecutive repetition counts are both less than the decision threshold, the bit encoded by the sampled data is decoded as a '1'; otherwise, if the repetition count is equal to or greater than 6, the bit encoded by the sampled data is decoded as a '0'.

In operation 911, the first device detects the end of the packet. The end of the packet may be flagged when no state transitions are detected over two consecutive data bit-widths. In one aspect, controller may declare the end of the packet when the sampled data does not toggle for more than one bit-width, but less than two bit-width. In one aspect, the controller may detect the end of the packet by polling and clearing the status of the GPIO interrupt periodically to detect that there is no activity on the data line.

In operation 913, upon detecting the end of the packet, the first device stops the sampling clock of the synchronous serial interface. The synchronous serial interface then stops further data sampling. In one aspect, when the end of the packet is detected through polling the GPIO interrupt, the controller may read the remaining sampled data from the FIFO of the synchronous serial interface.

Various embodiments of the techniques for decoding BMC-encoded signals described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device including an antenna, a radio frequency (RF) transceiver, a controller operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

In one embodiment, the power transmitting device may include a memory and a processing device. The memory may be synchronous dynamic random access memory (DRAM), read-only memory (ROM)), or other types of memory, which may be configured to store the code to perform the function of the BMC decoding. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. For example, while the disclosed techniques are illustrated using BMC-encoded data, the techniques are applicable to other protocols that use the phase or positioning of signal transitions within a data bit-width to encode data. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for decoding data, comprising:
   detecting, by a first device, start of a packet received from a second device, wherein data of the packet are encoded by signal edge positioning within a data bit-width;
   configuring, by the first device upon detecting the start of the packet, a sampling clock of a synchronous serial interface of the first device to oversample the data of the packet;
   collecting, by the synchronous serial interface, sampled data of the packet sampled using the sampling clock;
   receiving, by the first device from the synchronous serial interface, the sampled data when the sampled data is indicated as being available;
   decoding, by the first device, the data packet by counting a number of repeated sampled data between transitions of the sampled data;
   detecting, by the first device, end of the packet; and
   stopping, by the first device upon detecting the end of the packet, the sampling clock of the synchronous serial interface.

2. The method of claim 1, wherein detecting the start of the packet comprises:
   detecting a signal transition of the data of the data packet from a static state by an input port of the first device.

3. The method of claim 1, wherein detecting the end of the packet comprising:
   determining, by the first device, that the data of the packet remains static for more than one of the data bit-width.

4. The method of claim 1, wherein receiving the sampled data comprises:
   receiving, by the first device from the synchronous serial interface, the sampled data of the packet upon detecting the end of the packet.

5. The method of claim 1, wherein receiving the sampled data comprises:
receiving, by the first device from the synchronous serial interface, the sampled data of a portion of the packet stored before detecting the end of the packet.

6. The method of claim 1, wherein collecting the sampled data of the packet comprises:
storing autonomously, by the synchronous serial interface in a buffer, the sampled data of the packet upon the sampling clock being configured without further interaction with the first device.

7. The method of claim 1, wherein the data of the packet are encoded by bi-phase mark code (BMC) wherein a first state of the BMC is encoded by a first signal edge at a start of the bit-width followed by a second signal edge at a middle of the bit-width, and a second state of the BMC is encoded by a first signal edge at the start of the bit-width followed by a static signal through the bit-width, and wherein decoding the data packet comprises:
determining, by the first device, the sampled data as encoding the first state when the number of repeated sampled data between transitions is less than a threshold count for both a first portion of the bit-width and for a second portion of the bit-width; or
determining, by the first device, the sampled data as encoding the second state when the number of repeated sampled data between transitions is more than the threshold count for the bit-width.

8. The method of claim 7, wherein decoding the data packet further comprises:
determining, by the first device, a packet error when the number of repeated sampled data between transitions is less than the threshold count for a first portion of the bit-width and the number of repeated sampled data between transitions is more than the threshold count for a second portion of the bit-width.

9. The method of claim 7, wherein the sampling clock of the synchronous serial interface is configurable to one of a plurality of integer multiples of a signal baud rate of the data, and wherein the threshold count comprises a value of more than half of the integer multiple of the signal baud rate configured for the sampling clock to compensate for an error between the bit-width and the integer multiple of the signal baud rate.

10. The method of claim 1, wherein decoding the data packet further comprises:
ignoring transitions of the sampled data when the number of repeated sampled data between the transitions is below a glitch threshold.

11. An apparatus comprising:
an input port configured to detect start of a data packet, wherein data of the data packet are encoded by signal edge positioning within a data bit-width;
a synchronous serial interface configured to:
sample the data packet using a sampling clock; and
collect sampled data of the data packet sampled using the sampling clock;
and a processor configured to:
receive an indication of the start of the data packet from the input port;
initialize the sampling clock of the synchronous serial interface to oversample data of the data packet when the indication of the start of the data packet is received;
receive the sampled data from the asynchronous serial interface when the sampled data is indicated as being available;
decode the data packet by counting a number of repeated sampled data between transitions of the sampled data;
detect end of the data packet based on the sampled data; and
disable the sampling clock of the synchronous serial interface when the end of the data packet is detected.

12. The apparatus of claim 11, wherein to detect the start of the data packet, the input port is configured to:
detect a signal transition of the data of the data packet from a static state.

13. The apparatus of claim 11, wherein to detect the end of the data packet, the processor is configured to:
detect that the data packet remains static for more than one of the data bit-width.

14. The apparatus of claim 11, wherein the synchronous serial interface is further configured to:
indicate that the sampled data is available when a portion of the data packet has been sampled prior to the end of the data packet.

15. The apparatus of claim 11, wherein the synchronous serial interface is further configured to:
store autonomously in a buffer the sampled data of the data packet when the sampling clock is configured without further interaction with the processor.

16. The apparatus of claim 11, wherein the data of the data packet are encoded by bi-phase mark code (BMC) wherein a first state of the BMC is encoded by a first signal edge at a start of the bit-width followed by a second signal edge at a middle of the bit-width, and a second state of the BMC is encoded by a first signal edge at the start of the bit-width followed by a static signal through the bit-width, and wherein to decode the data packet, the processor is configured to:
determine the sampled data as encoding the first state when the number of repeated sampled data between transitions is less than a threshold count for both a first portion of the bit-width and for a second portion of the bit-width; or
determine the sampled data as encoding the second state when the number of repeated sampled data between transitions is more than the threshold count for the bit-width.

17. The apparatus of claim 16, wherein to decode the data packet, the processor is configured to:
determine a packet error when the number of repeated sampled data between transitions is less than the threshold count for a first portion of the bit-width and the number of repeated sampled data between transitions is more than the threshold count for a second portion of the bit-width.

18. The apparatus of claim 16, wherein to initialize the sampling clock, the processor is configured to:
initialize the sampling clock to one of a plurality of integer multiples of a signal baud rate of the data; and
initialize the threshold count to a value of more than half of the integer multiple of the signal baud rate used to initialize the sampling clock to compensate for an error between the bit-width and the integer multiple of the signal baud rate.

19. The apparatus of claim 11, wherein to decode the data packet, the processor is configured to:
ignore transitions of the sampled data when the number of repeated sampled data between the transitions is below a glitch threshold.

20. A system comprising:
a coil configured to wirelessly transmit a power signal, wherein a load impedance of the coil is modulated by data of a data packet transmitted by a receiving device receiving the power signal, wherein data of the data packet are encoded by signal edge positioning within a data bit-width;
a demodulator circuit configured to demodulate the data packet sensed from the coil;
an input port configured to detect start of the data packet demodulated by the demodulator circuit;
a synchronous serial interface configured to:
sample the data packet using a sampling clock; and
collect sampled data of the data packet sampled using the sampling clock;
and a processor configured to:
receive an indication of the start of the data packet from the input port;
initialize the sampling clock of the synchronous serial interface to oversample data of the data packet when the indication of the start of the data packet is received;
receive the sampled data from the asynchronous serial interface when the sampled data is indicated as being available;
decode the data packet by counting a number of repeated sampled data between transitions of the sampled data;
detect end of the data packet based on the sampled data; and
disable the sampling clock of the synchronous serial interface when the end of the data packet is detected.

* * * * *